Dec. 14, 1943.   A. E. SPINASSE   2,336,510
METHOD OF PRODUCING PLATE AND THICK GLASS
Filed Sept. 25, 1939
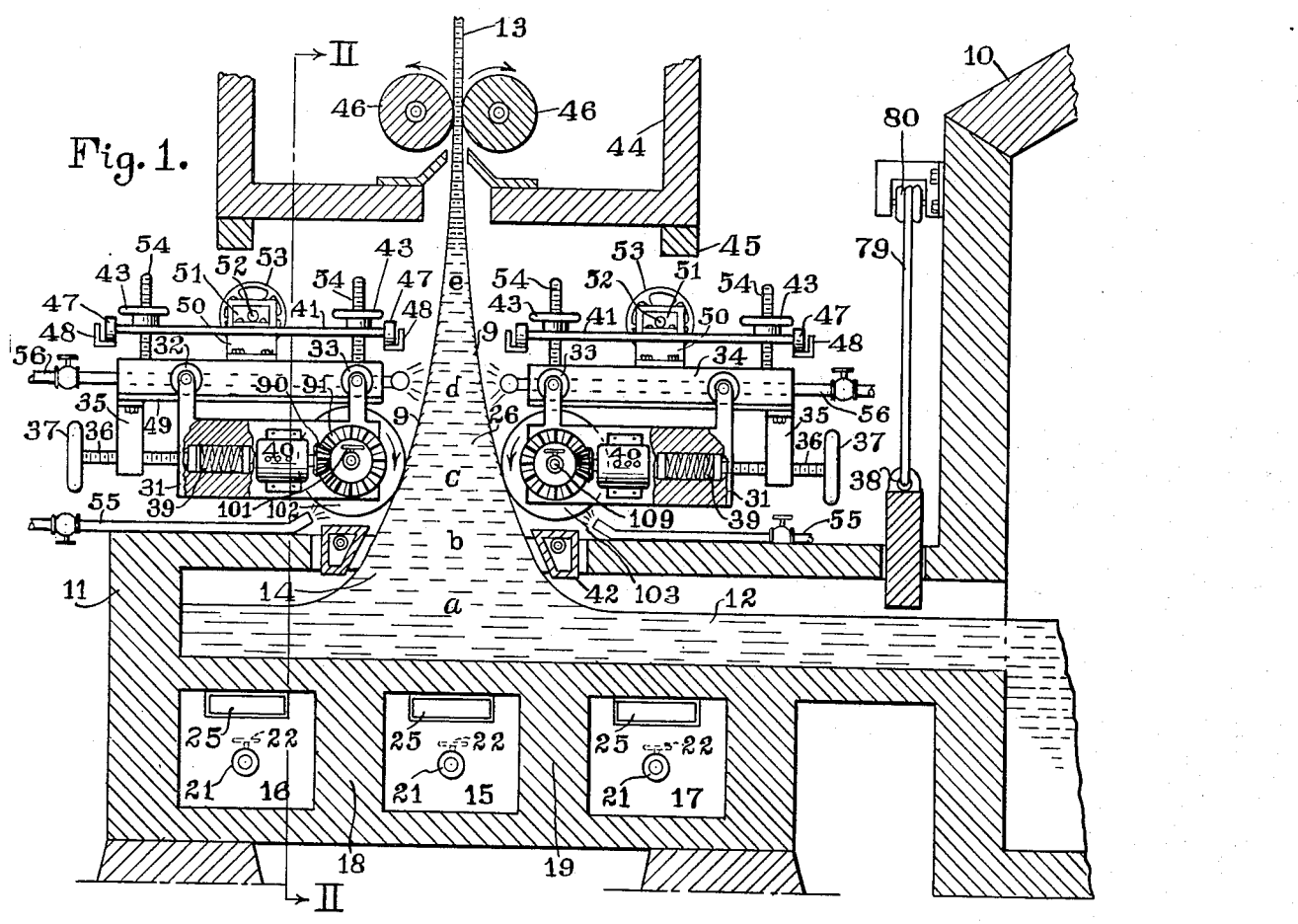
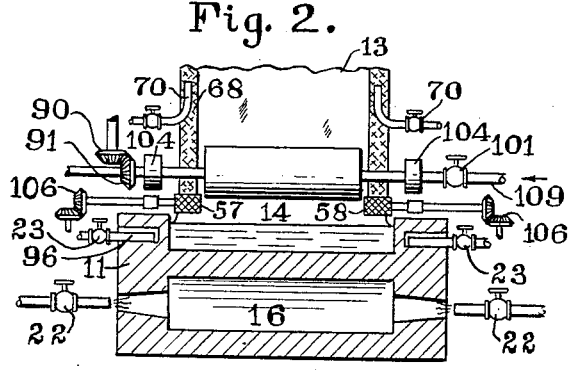
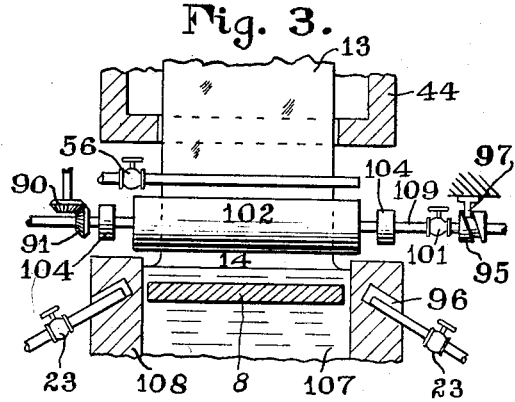
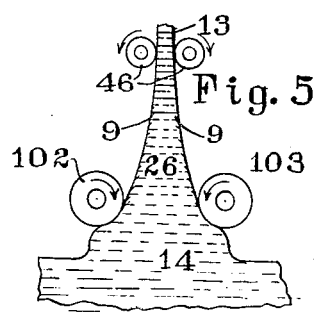
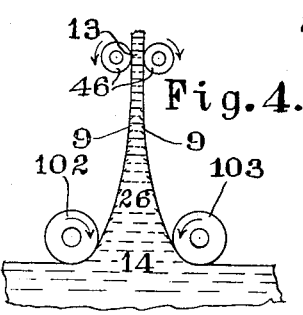
INVENTOR.
Arthur E. Spinasse Patented Dec. 14, 1943

2,336,510

UNITED STATES PATENT OFFICE 2,336,510

METHOD OF PRODUCING PLATE AND THICK GLASS

Arthur E. Spinasse, Mount Vernon, Ohio

Application September 25, 1939, Serial No. 296,457

20 Claims. (Cl. 49—83.1)

The present invention relates to improvements in method of producing plate or sheet glass and has for an object the production of plate glass having qualities equal to or surpassing the more expensive present plate glass and in which the plate or sheet glass will be comparatively free of waves, lines or similar blemishes such, for example, as caused by bending of the relatively soft glowing sheet from a vertical to an horizontal course over bending rolls.

It is another object of the present invention to provide an improved method for the inexpensive production of commercial plate glass by the direct process as compared with conventional ground and polished commercial plate glass, and wherein, in the present invention, the glass supplied to form the sheet will have a greater degree of flatness and uniformity of thickness and will be more homogeneous in texture, tough and strong, and of good temper and transparency.

A further object of the invention is to provide an improved method with a view to materially increasing the speed of drawing or expedite production and improve the quality of the glass, and to greatly facilitate the production of large plates of glass of desired thick and thin thicknesses, and so that such plates may be further subjected to a light surface polishing process with a saving of time, reduction in production cost, and with a minimum amount of breakage.

A further object of the present invention resides in providing an apparatus in which the parts are few and combined to save floor space, technical installation, and for successively acting upon the molten glass, meniscus and plate especially to impart to the finished drawn glass qualities of plate glass which it has heretofore been impractical to secure with prior methods and apparatus for producing plate glass from molten glass.

The improved steps of the process of the present invention comprise in part the tempering of a pool of molten glass and drawing a heavy upwardly tapering meniscus from the pool. The opposite surfaces of the rising meniscus are in the present invention lightly engaged at points above the surface of the pool with planishing means or surfacing rolls to prepare a thick blank from which the plate proper will take form. The rolls are located and rotated for surfacing, smoothing and polishing the surfaces of the blank while still soft but without, or preferably, without substantially deforming the natural contour of the meniscus and blank and preferably where the surfaces of the rising meniscus have cooled to such temperature to avoid the marring of the surfaces of the blank. In my present invention, the peripheries of the surfacing rolls preferably contact only along lines or bands of the rising meniscus and preferably rotate for sliding surface actions upon the surfaces of the rising meniscus or blank at a desired controlled speed, in directions opposite to the direction of movement of the glass being drawn by suitable drawing means. The said rolls are also preferably temperature controlled so as slightly to cool the surfaces of the blank at the lines or zones of contact and also to effect a cooling of the adjacent source of the rising glass, thereby causing the formation of a thickly drawn meniscus. The upper portion of the surfaced blank, not yet shaped to its final plate form, passes freely above the surfacing rolls and is drawn to form the plate in its final reduced thickness. The thus treated surfaces of the blank guide and determine the final formation of the plate with flat surfaces and uniform thickness.

From the foregoing and various other objects, the new co-action between the parts and advantages of the invention will result, as will be more fully described and understood, from the drawing and detailed description of the preferred embodiment thereof and the improved method or process of practicing the invention, as hereinafter more particularly set forth and particularly pointed out in the claims appended hereto.

In the accompanying drawing

Fig. 1 is a fragmentary vertical section taken through a melting tank furnace and apparatus according to the present invention.

Fig. 2 is a generally vertical section in part on the line II—II, Fig. 1 looking to the right but showing some modification of parts.

Fig. 3 is a view generally similar to that of Fig. 2 but showing an additional feature to which due reference will be made.

Fig. 4 is a detail view in cross section illustrating the surfacing rolls contacting with the base of the meniscus and widely spaced apart to allow the thick portion of the meniscus to pass between and above said rolls.

Fig. 5 is a similar view but showing the surfacing rolls bodily spaced above the level of the glass bath and spaced apart only to partially reduce the thickness of the meniscus and blank passing between and above the rolls.

As shown in Fig. 1, the character 10 designates a glass melting tank furnace of conventional form, and 11 designates a shallow shoulder refractory pot communicating with the furnace 10 for containing a shallow open bath of molten glass 12 received from the tank furnace from which to draw the plate or sheet indicated at 13. The bath of glass is preferably of substantially uniform depth, for example anywhere from 6 to 12 inches deep. The pot is closed at its front end and sides but with the rear end thereof open to the tank at the point of connection therewith as shown in Fig. 1. A thick glass meniscus 14, sometimes called the pickup, is drawn from the glass bath 12 by means of rolls 46—46, and well understood gears operated by a suitable source of power, and rotated in the directions shown by the arrows as they pull the plate of glass 13 upwardly through the leer 44 mounted upon a suitable support, one member of which is indicated at 45.

Below the pot 11 are disposed a number of independent heating chambers. In the embodiment shown in the drawing, three such chambers are provided, namely, a central chamber 15 located beneath the base of the meniscus of the glass sheet 13 and extending in line with and uninterruptedly throughout substantially the width of said pot; and also two lateral heating chambers 16 and 17 which are separated from the central chamber 15 by the partitions 18 and 19. The end walls of the chambers are provided with ports or openings 21 with controlled burners 22, and also dampers 25 for independently controlling the temperature of the chambers and hence the plasticity of the glass in the pot and also beneath the knurl rolls for the plate as indicated in Fig. 2.

At times it may be found desirable to draw the meniscus 14 from the glass lying directly above either wall 18 or 19 and in such case, two or four heating temperature controlling chambers are utilized in place of the three chambers shown in the drawing. These temperature controlling chambers and method of operation which can be used with advantages in combination with my present invention, may be in any number and sizes and extended in length substantially to the full width of the pot or plate glass to be produced, that is anywhere between 60 to 120 or more inches in length; and with the present invention it is thought that plate of glass 200 or more inches in width may be successfully drawn. These transverse chambers may be separately heated at any suitable independent drawing temperature. Some of the chambers may even remain unheated or be slightly cooled by circulating air through the same to obtain the desired temperature of the glass at the side and beneath the base of the meniscus 14 being drawn.

To this end adjustable damper 38 may be raised and lowered by means of cable 79 over pulley 80. For example: In the rear of the drawing kiln or pot the temperature may be maintained at 1975 degrees F. to 2000 degrees F., and in the front part thereof 1965 degrees F. to 1975 degrees F. in temperature. At the side of the meniscus the temperature of the glass may be maintained approximately 1950 degrees F., the horizontal line $a$ the base of the meniscus may be about between 1850 degrees F. to 1900 degrees F., at line $b$ the temperature of the meniscus may be about 1800 degrees F., at line $c$ where the surfacing rolls 102—103 contact with the surfaces of the meniscus the temperature may be approximately between 1550 degrees F. and 1650 degrees F., that is at a temperature where the glass is still slightly soft but preferably sufficiently low in degree to preclude marring the surfaces of the glass at the points or lines of contact with the surfacing rolls. The surfaced blank 26 is then drawn above the surfacing rolls where at line $d$ the temperature may still be approximately 1600 degrees F. or less, and at line $e$ about 1500 degrees F.

The blank progressively decreases in temperature and thickness until the finished plate finally passes between the drawing rolls 46—46. It will be noted that the above indicated temperatures may be much less in degrees and may vary at different lines depending on the thickness of the plate of glass to be produced.

At times the surfacing rolls may engage the surface of the glass near the softening point of the glass where the temperature of the glass may be as low as between 1200 degrees F. to 1300 degrees F., in which case the surfacing rolls will be positioned to engage the surfaces of the blank adjacent to the upper portion thereof.

In this case the cooling of the rolls will be reduced to a minimum or even omitted, adherence between the contacting surfaces being avoided by the low temperature of the glass and the high surface polish of the rolls. The surfacing rolls may also be positioned in surfacing contact with the thick base portion of the meniscus. In this case, the cooling of the rolls may be accentuated to produce a relatively lengthy and thick blank above the rolls, in which case heat is preferably applied to the opposite surfaces of the partially cooled blank above the rolls to slightly soften the glass blank for the final drawing of the plate. With the means and teaching herein provided, the operator of the drawing kiln will be able to obtain the local temperatures and result desired.

The rising meniscus 14 being drawn may be from 1 inch to 6 inches in thickness at its source, more or less, tapers upwardly from 8 to 16 inches, more or less, depending on the degree of the cooling, the speed of drawing the glass, and the composition and temperature of the glass.

In the views, the surfacing rolls 102—103 are oppositely disposed in a horizontal plane above the glass bath and extend transversely of the rising meniscus 14. They are supported in suitable bearings (such as shown at 104, Figs. 2 and 3), which bearings form part of a trolley frame or block member 31 supported by wheels 32—33 on track 49 of frame or plate 34. Connected with this plate 34 are blocks 35—35 through which are engaged threaded shafts 36—36, the ends of which shafts are rotatively connected to plates 31—31 as shown so that when the wheels 37—37 are rotated, the surfacing rolls 102—103 can be horizontally and independently advanced or retracted with respect to the surfaces of the meniscus 14 to prepare the blank from which to draw the plate. The springs 39—39 in said recesses allow for slight yielding action of the surfaces of the rolls upon the surfaces of the meniscus.

Electric motors 40—40, mounted upon plates 31—31, operate gears 90—91 to rotate the rolls 102—103. Said motors have well understood switch connections (not shown) for starting and to independently rotate the motors either in the same or opposite directions, and for reversing the directions of rotation and for varying the speed thereof, and hence the speed of rotation of the rolls in either direction. Frame or plate 34 is also supported to a transverse truck or trolley 41 by means of threaded vertical shafts 54—54, as shown, so that when wheels 43—43 are rotated, the surfacing rolls 102—103 or the end portions thereof will be independently raised and lowered to any desired positions toward or from the surface of the glass and therefore, to engage the surfaces of the meniscus at any desired points between the base and top portions thereof inclusive.

Wheels 47—47 of truck 41 rest upon parallel track members 48, 48, these track members being disposed at right angles to the vertical plane which includes the plate 34. A hand wheel 53 is provided which, when rotated, causes movement of the wheels 47—47 along track members 48—48, and therefore causes movement of the surfacing rolls horizontally along the surface of the rising meniscus. When the truck is in the desired position the wheels 47—47 can be fixed by any well known means. These trucks including the rolls and associated parts may be removed from the drawing kiln for repairs or renewals.

Plates 50 and 51 may be attached one to member 34—34 and the other to truck members 41—41 as shown. Threaded horizontal shafts 52—52 screw through plates 50—50. The ends of said shafts being attached to rotate in plates 51—51 so that when wheels 53—53 of said shafts are rotated, the surfacing rolls will be moved to desired positions transversely of the meniscus. The above may be omitted when means for imparting reciprocating movements to the rolls is used as will be made clear in connection with Fig. 3.

Hollow axles 109—109 for the surfacing rolls and valves 101—101 are also provided for circulating a cooling or temperature controlling medium within the rolls. These surfacing rolls may be made of cast iron, chrome steel, chromium plated, or chrome-molybdenum steel or any other refractory material of fine texture and with smooth or polished surfaces. These rolls may be slightly cooled to assist in conditioning the surfaces of the blank and in preventing adherence of the surfaces thereof to the glass at the lines of contact. At times a wax or lubricant or other material tending to have a polishing effect on the surfaces of the meniscus, without smearing the glass, can be applied to the surfaces of the surfacing rolls by suitable means such as pipes 55—55 to assist in preventing this adherence and to assure a better slippery or sliding action of the surfacing rolls upon the surfaces of the meniscus, thereby also assuring a better polished surface of the plate.

The speed of the surfaces of the rolls may be rapid or many times that of the speed of drawing and the rolls may be disposed closely adjacent to the surface of the glass bath, thereby cooling the glass in advance of contact with the surfacing rolls.

The cooling and degree of gloss imparted to the surfaces of the blank 26 may be varied by the operator which depends upon the speed of rotation as well as the cooling of the surfacing rolls and the position of contact of said rolls with the glass. The glass may be partially cooled in advance of reaching the surfacing rolls by means of water cooled members 42—42 positioned above the glass adjacent the base of the meniscus beneath said surfacing rolls. As the cooling of the glass adjacent the meniscus is increased the temperature of the glass in the pot or tank and in proximity to the source of the meniscus will also be increased to counteract any undue cooling effect on the glass bath.

As indicated by lines hatching the surfaces 9—9 of the blank 26 are slightly cooled and smoothed and serve to guide the final formation of the plate.

The inner heat of the blank partially reheats the surfaces of the blank being drawn. When increased cooling of the surfaces of the blank is relied upon, burners 56—56 are provided to partially reheat the same above the rolls transversely of the meniscus. When the partially cooled surfaces of the thus treated and conditioned blank are reheated even equal to the inner heat of the blank, I have discovered that the surfaces of the blank nevertheless still retain, at least in part, their properties and function for guiding the inner mass of the blank in the final drawing of the blank and formation of the plate.

Fig. 2 shows a modification wherein the molten glass is supplied to and drawn from a shallow pot 11, in connection with individual temperature controlling chambers 16, 15, and 17, burners 22 and porthole 21. The surfacing rolls 102—103 have hollow axles 109 supported by bearings 104—104 and rotated by bevel gears 90 and 91. Valves 101 serves to supply and control a cooling fluid through the rolls. The surfacing rolls engage the meniscus within the border portions thereof and are rotated for conditioning a blank, such as shown at 26 in Fig. 1, which blank is then drawn to form the plate 13. Temperature controlled knurl rolls 57 and 58 are operated by gears 106 and engage the border portion of the meniscus to form knurled borders 68 in the plate. They may also be positioned to engage the border portions of the blank above the rolls. Burners 70—70 are used for heating the knurled glass portions to facilitate the final drawing of the plate. Valves 23, including conduits 96—96 and extending into recesses in the walls of the pot or tank serve to govern the temperature of the walls and glass on minute areas at the sources of the edges of the rising meniscus to thereby maintain the positions of such edges and prevent portions of unduly thick glass from rising in the plate.

Fig. 3 shows a combination of the blank forming rolls 102—103 with a deep glass drawing tank 108, the meniscus being drawn from the deep bath of molten glass 107. Anchorage member, such as a bar or slab 8, is shown submerged in the glass beneath the base of the meniscus. The anchorage means claimed in my Patents No. 1,925,414, dated September 5, 1933, and also in No. 1,882,262, dated October 11, 1932, may be used with advantage in combination with the above. However, with my present invention these submerged devices may be omitted, relying solely upon the surfacing rolls to maintain the positions of both the rising meniscus beneath and the conditioned blank of glass above said rolls, which blank is then drawn to form the plate.

A cam 95 with an inclined groove is fastened to hollow axle 109 and a fixed finger 97 is positioned to engage the inclined groove of the cam so that when the surfacing rolls are rotated, a reciprocal rectilinear motion of the surfaces of the rolls will be produced upon the surfaces of the blank being formed. It is preferable to rotate and reciprocate roll 102 in the opposite direction to the movements of roll 103, thereby to avoid undue pull toward one edge of the forming blank, and to obtain a better polishing and smoothing action on the surfaces of the forming blank 26 from which the plate is then drawn. Axles 109—109, of course, both rotate and slide longitudinally in bearings 104—104. Gears 90 and 91 may also be mounted either to move with their respective axles or slide thereon as well understood so as not to interfere with the rectilinear movements of the rolls.

Another method or variant for producing glass blanks with the means described, and from which the plate is then drawn either in heavy or relatively thin thicknesses, is indicated in Fig. 4, wherein a blank 26 is positively reduced in thickness and otherwise conditioned by the surfacing rolls 102 and 103 from the drawn meniscus 14. The surfaces 9—9 of the blank 26 are also smoothed or polished and slightly cooled and then it is drawn and reduced in final thickness to form the plate. The rolls also rotate in directions opposite to the direction of travel of the rising blank at the point of contacts.

In Fig. 5, the surfacing rolls are also spaced apart a distance much greater than that of the finished thickness of the plate and located adjacent to the surface of the glass bath so that a conditioned blank 26 will be formed by the rolls 102—103 as the plate 13 is being drawn to final thickness. The rolls also preferably rotate in a direction opposite to the direction of movement of the plate at the point of contact with the glass.

Preferably the surfacing rolls are rotated so that the surfaces thereof will slide upon the surfaces of the rising meniscus in the opposite direction to the movement of the rising meniscus 14. A controlled resistance and tension may thus be produced in the glass blank being drawn and forming plate between the surfacing rolls and the drawing rolls throughout the transverse portion of the blank or drawn plate. The retarding or impelling action upon the conditioned glass blank may thus be substantially eliminated or promoted and controlled by changing the positions of the surfacing rolls, spaced more or less apart upon the base of the glass blank, also by modifying their temperatures, and by changing their speeds and directions of rotation. The sliding action of the surfacing rolls serve for smoothing the surfaces of the forming blank from which to draw the plate. A rubbing action may also be produced by said surfacing rolls upon the surfaces of the forming blank.

When the surfacing rolls are rotated in the same direction as that of the movement of the glass plate, and at greater speed at the lines of contact with the glass, the surfaces of the rolls will slide upon the surfaces of the meniscus, preferably without exerting any substantial impelling force upon the rising meniscus or blank being drawn by rolls 46—46. This is due to the light contact of the surfacing rolls with the glass. The movement of the rising glass is produced by the drawing rolls 46—46. From time to time the surfacing rolls may be actuated at substantially the same or lesser peripheral speed as that of the drawing rolls and movement of travel of the thick meniscus and blank being drawn, and said surfacing rolls may be rotated in the opposite directions to each other at the lines of contact with the opposite surfaces of the rising meniscus 14 and blank 26. In this manner a counteracting effect will result between the surfaces of the rolls upon the glass in the process of conditioning the glass blank.

In the past it has been difficult to produce cast plate glass of light weight due to breakage in the grinding and polishing process. With the present invention thin plate as light as $\frac{1}{16}$ of an inch in thickness may rapidly be produced at low cost and with a minimum of breakage.

From the above, it is thought that the apparatus and method herein described, application and advantage to be derived from the present invention will be clear and appreciated, and that various changes and modifications may be made in the details of construction and design of the specifically described embodiment of this invention without departing from the spirit thereof.

What I claim is:

1. The process of producing plate glass which consists in drawing a free meniscus from the free normal surface of a glass bath, engaging the surfaces of the rising meniscus below the sheet transversely thereof with surfacing rolls, governing the temperature of the surfacing rolls to slightly cool the surfaces of the glass while rotating the same to produce a smoothing sliding action upon the surfaces of the rising meniscus, maintaining the surfacing rolls spaced apart to permit the drawing of a thick conditioned blank meniscus extending above said rolls, reheating the surfaces of said conditioned blank and continuing the drawing of said blank meanwhile substantially freely forming the plate in reduced thickness during drawing.

2. The method of producing plate glass by the direct process which consists in drawing a free meniscus from the free normal surface of a glass bath, engaging the surfaces of the rising meniscus transversely thereof with surfacing rolls, applying a lubricant to said rolls and governing the temperature thereof to partially cool the surfaces of the rising glass while rotating the same to produce a smoothing and polishing action of the surfaces of the rolls upon the surfaces of the free rising meniscus, maintaining the surfacing rolls spaced apart to permit the formation of a thick conditioned blank meniscus extending from between to a point above said surfacing rolls while at the same time applying heat to the surfaces of the thus conditioned blank and continuing freely forming the plate in finished thickness during drawing.

3. The method of producing plate glass which consists in drawing a free meniscus from the free normal surface of a glass bath and engaging the surfaces of the rising meniscus above the bath and below the plate transversely thereof with surfacing rolls, cooling the surfacing rolls to partially cool the surfaces of the glass and imparting to said rolls rotary and longitudinal movements for smoothing the surfaces of the meniscus and form a conditioned blank extending above said rolls, and reheating the conditioned surfaces of the blank above the rolls during the drawing of said blank to form the plate.

4. The process of forming a sheet or plate of glass consisting in drawing with suitable means from a glass bath a thick meniscus between contacting surfacing rolls extending substantially transversely of the meniscus and with the rolls so spaced apart to permit a substantial portion of the surfaced thick meniscus to pass between and freely extend above said rolls before the sheet acquires its final reduced thickness, meanwhile cooling the rolls to partially cool the surfaces of the meniscus and thereafter reheating the cooled surfaces of the meniscus above the rolls and below the sheet glass being drawn.

5. The continuous direct process of manufacturing sheet or plate glass which comprises drawing upwardly from a bath of molten glass a sheet-like plastic body which includes a free meniscus of substantial length, base thickness and height, said sheet-like plastic body terminating upwardly in a solid sheet of final thickness to which traction devices may be applied, and continuously cooling a side surface of the meniscus to form thereon a surface film, such film being initially formed at an elevation intermediate the base and top of the meniscus and extending upwardly therefrom so as to serve as a guide for that portion of the rising glass body which is changing from plastic to solid condition in the formation of the final sheet.

6. The continuous direct process of manufacturing sheet or plate glass which comprises drawing upwardly from a bath of molten glass a sheet-like plastic body which includes a free meniscus of substantial length, base thickness and height, said sheet-like plastic body terminating upwardly in a solid sheet of final thickness to which traction devices may be applied, and continuously cooling the opposite side surfaces of the meniscus to form surface films thereon, respectively, each such film being initially formed at an elevation intermediate the base and top of the meniscus and extending upwardly therefrom, said films serving to guide that portion of the rising glass body which is changing from plastic to solid condition in the formation of the solid sheet.

7. The continuous direct process of manufacturing sheet or plate glass which comprises drawing upwardly from a bath of molten glass a sheet-like plastic body which includes a free meniscus of substantial length, base thickness and height, said sheet-like plastic body terminating upwardly in a solid sheet of final thickness to which traction devices may be applied, and continuously cooling the oppositely facing side surfaces of the meniscus by causing successive elongated and relatively narrow areas of said surfaces to directly contact, respectively, with cooling elements, a film of partially cooled glass being formed on each such surface as a result of such contact, initially at an elevation intermediate the base and top of the meniscus, and extending upwardly therefrom, said films serving to guide that portion of the rising glass body which is changing from plastic to solid condition in the formation of the solid sheet.

8. The continuous direct process of manufacturing plate glass which comprises drawing upwardly from a bath of molten glass a plate-like plastic body which includes a free meniscus of substantial length, base thickness and height, said plate-like plastic body terminating upwardly in a solid plate of final thickness to which traction devices may be applied, and continuously cooling the oppositely facing side surfaces of the rising meniscus by causing said surfaces along successive narrow portions extending substantially transversely thereof, to directly contact, respectively, with cooling elements located above the surface of the bath and substantially below the top of the meniscus, a film of partially cooled glass being formed on each such surface as a result of such contact, said films serving to guide that portion of the rising glass body which is changing from plastic to solid condition in the formation of the solid plate.

9. The continuous direct process of manufacturing plate glass which comprises drawing upwardly from a bath of molten glass a plate-like plastic body which includes a free meniscus of substantial length, base thickness and height, said plate-like plastic body terminating upwardly in a solid plate of final thickness to which traction devices may be applied, and continuously cooling and rubbing the oppositely facing side surfaces of the rising meniscus by causing said surfaces along successively elongated portions extending substantially transversely thereof to directly contact, respectively, with cooling moving elements, films of partially cooled and conditioned glass being formed on such surfaces as a result of such cooling and rubbing, each film being formed initially at an elevation intermediate the base and top of the meniscus and extending upwardly therefrom, said films serving to guide that portion of the rising glass body which is changing from plastic to solid condition in the formation of the solid plate.

10. The continuous direct process of manufacturing plate glass which comprises drawing upwardly from a bath of molten glass a plate-like plastic body which includes a free meniscus of substantial length, base thickness and height, said plate-like plastic body terminating upwardly in a solid plate of final thickness to which traction devices may be applied, and continuously cooling and rubbing successive and relatively narrow elongated horizontally extending zones of the oppositely facing side surfaces of the meniscus substantially transversely thereof, with cooled moving elements, films of partially cooled glass being formed on such surfaces as a result of such cooling and rubbing, each film being formed initially at an elevation above the surface of the bath and substantially below the top of the meniscus, and extending upwardly therefrom, said films serving to guide that portion of the rising glass body which is changing from plastic to solid condition in the formation of the solid plate.

11. The continuous direct process of manufacturing sheet or plate glass which comprises drawing upwardly from a bath of molten glass a plate-like plastic body which includes a free meniscus of substantial length, base thickness and height, said plate-like plastic body terminating upwardly in a solid plate of final thickness to which traction devices may be applied, and continuously cooling and rubbing the oppositely facing side surfaces of the meniscus by causing said surfaces along successive narrow portions extending substantially transversely thereof, to directly contact, respectively, with cooled moving elements, films of partially cooled glass being formed on such surfaces as a result of such cooling and rubbing, each film being formed initially at an elevation above the surface of the bath and substantially below the top of the meniscus, and extending upwardly therefrom, anchoring the edges of the meniscus adjacent the source thereof, and rolling the border portions of the rising plate-like plastic body, said films serving to guide that portion of the rising glass body which is changing from plastic to solid condition in the formation of the solid plate.

12. The continuous direct process of manufacturing plate glass which comprises drawing upwardly from a bath of molten glass a plate-like plastic body which includes a free meniscus of substantial length, base thickness and height, said plate-like plastic body terminating upwardly in a solid plate of final thickness to which traction devices may be applied, and continuously cooling and rubbing successive and relatively narrow elongated, horizontally extending zones of the oppositely facing side surfaces of the meniscus by causing said surfaces to directly contact, respectively, with the smooth artificially cooled surfaces of cylinders rotating at such angular velocities that the surfaces thereof move at high velocities over the surfaces of the glass, films of partially cooled glass being formed on such surfaces as a result of such cooling and rubbing, each such film being formed initially at an elevation intermediate the base and top of the meniscus and extending upwardly therefrom, said films serving to guide that portion of the rising glass body which is changing from plastic to solid condition in the formation of the plate.

13. The continuous direct process of manufacturing plate glass which comprises drawing upwardly from a bath of molten glass a plate-like plastic body which includes a free meniscus of substantial length, base thickness and height, said plate-like plastic body terminating upwardly in a solid plate of final thickness to which traction devices may be applied, and continuously cooling and rubbing successive portions of the oppositely facing side surfaces of the meniscus by causing said surfaces to directly contact, respectively, with the smooth surfaces of artificially cooled cylinders which surfaces are moving in directions opposed to the directions of movement of the meniscus surfaces with which they are in contact, films of partially cooled glass being formed on such surfaces as a result of such cooling and rubbing, each such film being formed initially at an elevation intermediate the base and top of the meniscus and extending upwardly therefrom, said films serving to guide that portion of the rising glass body which is changing from plastic to solid condition in the formation of the plate.

14. The continuous process of manufacturing plate glass which comprises drawing upwardly from a bath of molten glass a plate-like plastic body which includes a free meniscus of substantial length, base thickness and height, said plate-like plastic body terminating upwardly in a solid plate of final thickness to which traction devices may be applied and continuously cooling and rubbing successive narrow elongated horizontally extending portions of the surfaces of the rising meniscus by causing said successive narrow portions to contact with the cooled surfaces of rotating water-cooled cylinders positioned adjacent the lower portion of the meniscus, the upper portion of such surface treated meniscus passing between, and freely projecting a substantial distance above, the glass contacting cooled surfaces of said rotating cylinders, such treated side surfaces of the free rising meniscus above said cooling and rotating cylinders serving to guide that portion of the rising glass body which is changing from plastic to solid condition in the formation of the plate.

15. The continuous direct process of manufacturing sheet or plate glass which comprises drawing upwardly from a bath of molten glass a sheet-like plastic body which includes a free meniscus of substantial length, base thickness and height, said sheet-like plastic body terminating upwardly in a solid sheet of final thickness to which traction devices may be applied, and continuously cooling and rubbing successive areas of the oppositely facing side surfaces of the meniscus by causing said surfaces to directly contact, respectively, with the smooth artificially cooled surfaces of rotating cylinders located above the surface of the bath, and substantially below the upper portion of the meniscus, cooling the surfaces of the rising meniscus by means of cooling elements positioned below the cylinders and in spaced relation to the glass, and reheating the thus cooled and rubbed portions of the meniscus above the rolls, films of partially cooled glass being formed on such surfaces as a result of such cooling and rubbing, each such film being formed initially at an elevation above the surface of the bath and substantially below the top of the meniscus and extending upwardly therefrom, said films serving to guide that portion of the rising glass body which is changing from plastic to solid condition in the formation of the sheet.

16. The continuous direct process of manufacturing plate glass which comprises drawing upwardly from a bath of molten glass a plate-like plastic body which includes a free meniscus of substantial length, thickness and height, said plate-like plastic body terminating upwardly in a solid plate of final thickness to which traction devices may be applied, continuously conditioning the opposite side surfaces of the rising meniscus by cooling and rubbing successive, narrow, elongated, horizontally extending areas of the said surfaces as such areas reach elevations intermediate the base and top of the meniscus to form films of partially cooled glass thereon, respectively, and thereafter reheating the films formed as a result of the cooling and rubbing operation, the said films serving to guide that portion of the rising glass body which is changing from plastic to solid condition in the formation of the plate.

17. The continuous direct process of manufacturing sheet or plate glass which comprises drawing upwardly from a bath of molten glass a sheet-like plastic body which includes a free meniscus of substantial length, base thickness and height, said sheet-like plastic body terminating upwardly in a solid sheet of final thickness to which traction devices may be applied, continuously rubbing the opposite side surfaces of the rising meniscus by causing said surfaces along successive narrow portions extending substantially transversely thereof, and substantially below the top of the meniscus to directly contact, respectively, with cooled rotating cylinders while constantly lubricating the surfaces of said cylinders, films of partially cooled glass being formed on such surfaces as a result of such rubbing with said cooled and lubricated cylinders, the said films serving to guide that portion of the rising glass body which is changing from plastic to solid condition in the formation of the sheet.

18. The continuous direct process of manufacturing sheet or plate glass which comprises drawing upwardly from a bath of molten glass a sheet-like plastic body which includes a free meniscus of substantial length, base thickness and height, said sheet-like plastic body terminating upwardly in a solid sheet of final thickness to which traction devices may be applied, continuously cooling the oppositely facing side surfaces of the meniscus by causing said surfaces, along successive narrow portions extending transversely thereof, to directly contact, respectively, with the artificially cooled surfaces of moving cooling members, films of partially cooled glass being formed on such surfaces as a result of such cooling, each such film being formed initially at an elevation above the surface of the bath and substantially below the top of the meniscus, and extending upwardly from said surfaces, said films serving to guide that portion of the rising glass body which is changing from plastic to solid condition in the form of the sheet, and relatively moving said members with respect to each other to regulate as desired the thickness of the meniscus.

19. The continuous process of manufacturing sheet or plate glass and for conditioning and increasing the body thickness of a meniscus being drawn from a bath of molten glass, which comprises continuously drawing with suitable means an elongated meniscus from the glass bath, and continuously cooling and rubbing the oppositely facing side surfaces of the meniscus by causing said surfaces along successive narrow elongated portions extending substantially transversely thereof to directly contact, respectively, with the cooled surfaces of rotating cylinders which are spaced apart from one another to permit a meniscus of predetermined thickness to pass between and freely project above said cylinders, each such conditioned surface of the meniscus being formed initially at an elevation adjacent the surface of the bath and relatively remote from the top of the meniscus, such conditioned surface portions of the meniscus serving to guide the rising glass being drawn which is changing from plastic to solid condition in the formation of the finished sheet or plate.

20. The continuous direct process of manufacturing sheet or plate glass which comprises drawing upwardly from a deep bath of molten glass a plate-like plastic body which includes a free meniscus of substantial length, base thickness and height, said plate-like plastic body terminating upwardly in a solid plate of final thickness to which traction devices may be applied, and continuously cooling and rubbing the oppositely facing side surfaces of the meniscus by causing said surfaces along successive narrow portions extending substantially transversely thereof, to directly contact, respectively, with cooled moving elements, as such portions reach elevations intermediate the base and the top of the meniscus, films of partially cooled glass being thus formed on said surfaces as a result of such cooling and rubbing, each film being formed initially at an elevation above the base of the meniscus and extending upwardly from the elevation of initial formation, anchoring the edges of the meniscus adjacent the source thereof, also anchoring the base of the meniscus from beneath from side to side between the anchored edges of such meniscus, and rolling the border portions of the rising glass, said films serving to guide that portion of the rising glass body which is changing from plastic to solid condition in the formation of the solid plate.

ARTHUR E. SPINASSE.